United States Patent [19]

Hanai et al.

[11] 4,304,977

[45] Dec. 8, 1981

[54] FLASH WELDING APPARATUS

[75] Inventors: Satoshi Hanai; Takao Karvanami, both of Tohkai; Yoshimasa Komatsu, Ohita; Akiyoshi Uomori; Toshihiko Baba, both of Amagasaki, all of Japan

[73] Assignees: Nippon Steel Corporation; Mitsubishi Denki Kabushiki Kaisha, both of Tokyo, Japan

[21] Appl. No.: 118,464

[22] Filed: Feb. 4, 1980

Related U.S. Application Data

[63] Continuation of Ser. No. 923,226, Jul. 10, 1978.

[30] Foreign Application Priority Data

Jul. 12, 1977 [JP] Japan .................................. 52-83451

[51] Int. Cl.³ .............................................. B23K 11/04
[52] U.S. Cl. ..................................... 219/97; 219/105; 228/5.7
[58] Field of Search ......................... 219/97, 100, 105; 228/5.7

[56] References Cited

U.S. PATENT DOCUMENTS

| | | | |
|---|---|---|---|
| 3,307,764 | 3/1967 | Robinson | 228/5.7 |
| 3,808,393 | 4/1974 | Goodwin et al. | 219/105 X |
| 4,096,375 | 6/1978 | Fujino et al. | 219/97 |

Primary Examiner—Gene Z. Rubinson
Assistant Examiner—Keith E. George
Attorney, Agent, or Firm—Oblon, Fisher, Spivak, McClelland & Maier

[57] ABSTRACT

In a flash welding apparatus, different length guides and driving devices thereof are formed on lower parts of an inlet side electrode table and an outlet side electrode table and the electrode tables and a compact rotary shear unit are arranged in the direction perpendicular to a strip line when both of the electrode tables are approached and one of the guides is commonly used as a guide for shifting a flash trimmer lower unit and a guide is formed on one of the upper electrode frames of the electrode tables so as to shift a flash trimmer upper unit and the rotary shear unit of the inlet side electrode table and the rotary shear unit of the outlet side electrode table and a pair of the upper and lower trimmer units are aligned in the plan view.

4 Claims, 9 Drawing Figures

FLASH WELDING APPARATUS

This is a continuation of application Ser. No. 923,226, filed July 10, 1978.

BACKGROUND OF THE INVENTION

1. Field of the Invention

The present invention relates to a flash welding apparatus which is employed in an iron-steel continuous acid washing line (strip line) etc. More particularly, it relates to a flash welding apparatus comprising rotary shears and a trimmer.

2. Description of the Prior Art

Figure 1:
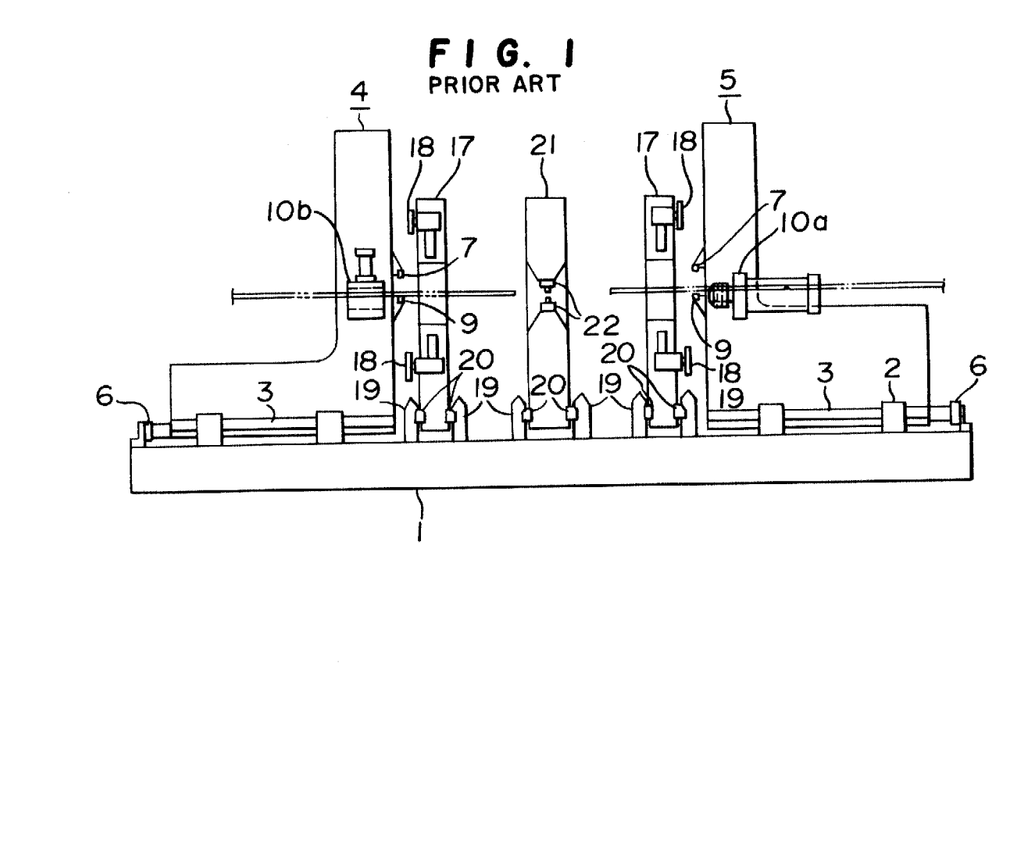
FIG. 1 is a front view of a conventional flash welding apparatus for an iron-steel continuous acid washing line (strip line)
Figure 2:
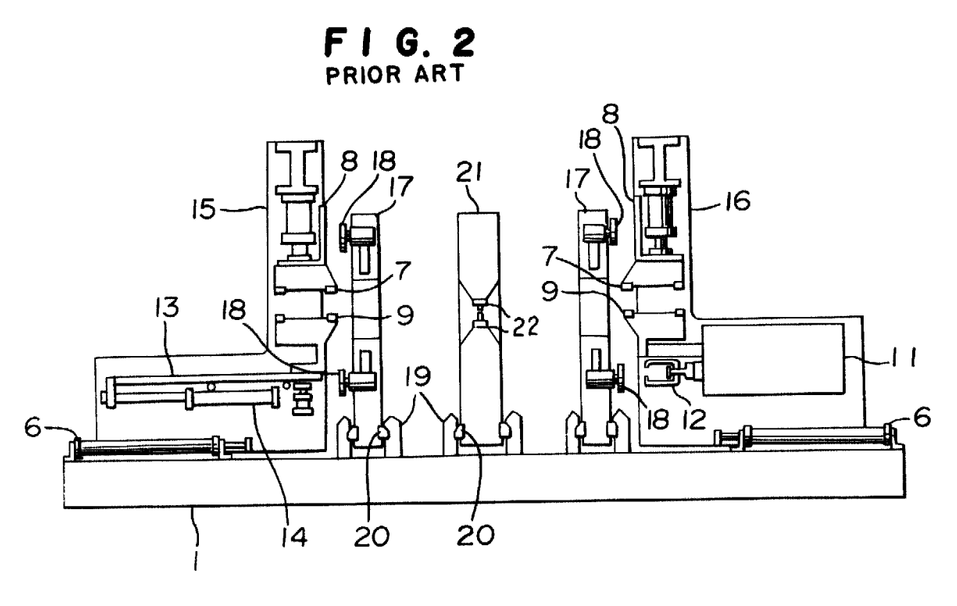
FIG. 2 is a front sectional view thereof.

FIG. 1 is a front view of a conventional flash welding apparatus for iron-steel continuous acid washing line; FIG. 2 is a sectional view thereof and FIG. 3 is a side view thereof.

Figure 3:
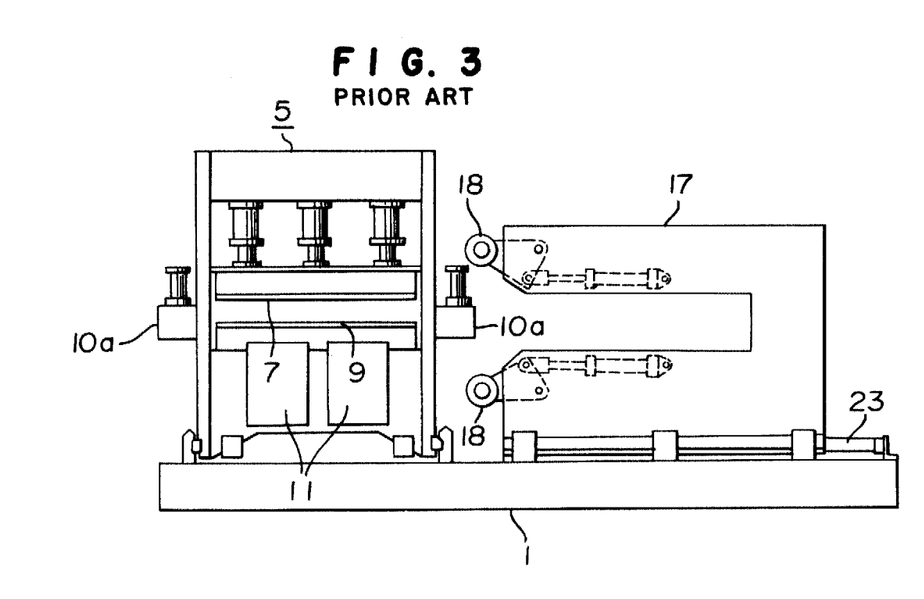
FIG. 3 is a side view thereof.

In FIGS. 1 to 3, the reference (1) designates a lower frame; (2) designates a guide mounted on the lower frame; (3) designates a guide bar which is guided by the guide (2); (4) and (5) designate respectively an inlet side electrode table and an outlet side electrode table; (5) designates an electrode table delivery cylinder which is mounted on the lower frame (1) and whose end of a rod is connected to the inlet side electrode table (4) and the outlet side electrode table (5) to independently move the table (4) and the table (5) on the lower frame (1); (7) designates an upper electrode; (8) designates an upper electrode frame; (9) designates a lower electrode; (10a) designates a detachable up-set cylinder mounted on the outlet side electrode table (5); (10b) designates a detachable mechanism at the end of the rod of the up-set cylinder (10a) which faces the detachable up-set cylinder (10a) on the inlet side electrode table (4); (11) designates a transformer for welding; (12) designates a detachable secondary conductor connecting part; (13) designates a secondary side bus-bar; (14) designates a cylinder for shifting the secondary side bus-bar; (15) designates a holding frame of the inlet side electrode table (4); (16) designates a holding frame of the outlet side electrode table (5); (17) designates a shearing machine for a scrape treatment of top and rear edge of a strip and said shearing machine having a C shape frame; (18) designates a pair of rotary shears disposed at the opening of the C shape frame thereof; (19) designates a guide mounted on the lower frame (1); (20) designates a guide bar; (21) designates a flash trimmer having a C shape frame; (22) designates a tool holder and (23) designates a delivery cylinder of a shearing machine.

Thus, the inlet side electrode table (4), the outlet side electrode table (5), two pairs of rotary shears (18) and the trimmer (21) are mounted on the lower frame (1) so as to be independently movable.

The structure of the conventional flash welding apparatus for an iron-steel continuous acid washing line and the lay-out of the main parts have been described.

The inlet side electrode table (4) and the outlet side electrode table (5) are mutually departed by releasing the connections of the detachable up-set cylinder (10a) and the detachable secondary conductor connecting part and they are mutually, backwardly shifted to stay at the original positions.

Two pairs of the rotary shears (18) are disposed on the lower frame at the specific positions out of a strip line in independently separating from the inlet side electrode table (4) and the outlet side electrode table (5). Accordingly, the rotary shears (18) are driven by the shearing machine delivery cylinder (23) only when the inlet side electrode table (4) and the outlet side electrode table (5) are kept in the original positions (waiting position) whereby they are shifted into the strip line to carry out the scrape treatment for the top and rear edges of the strip in the welding apparatus. After the scrape treatment, the rotary shears (18) return to the original positions. Accordingly, only the inlet side electrode table (4) and the outlet side electrode table (5) can be mutually approached whereby the welding can be carried out under the condition connecting the detachable up-set cylinder (10a) and the detachable secondary conductor connecting part (12).

However, the conventional welding apparatus has the following disadvantages.

(1) In the conventional flash welding apparatus for an iron-steel continuous acid washing, the scrape treatment of the top and rear edge of the strip is carried out in the apparatus, whereby two pairs of rotary shears are required and accordingly, the rotary shears are obliged to dispose out of the strip line in independently separating from the electrode tables so as to maintain the approach of the electrodes in the welding operation.

(2) The rotary shears should have each C shape frame whereby high rigidity is required and a long distance for departing the electrode tables is required to spend much time for shifting the electrode table to the welding position after the scrape treatment.

(3) The rotary shears are disposed at the specific positions for easily adjusting the positions of the electrode table and the rotary shears, whereby the electrode tables should be departed for a distance depending upon the structure even though the scrape degree is small and the time loss is caused.

SUMMARY OF THE INVENTION

The present invention is to overcome the disadvantages of the conventional flash welding apparatus by the improvement that different length guides and driving devices thereof are formed on lower parts of an inlet side electrode table and an outlet side electrode table and the electrode tables and compact rotary shear unit are arranged in the direction perpendicular to a strip line when both of the electrode tables are approached and one of the guide is commonly used as a guide for shifting a flash trimmer unit and a guide is formed on one of the upper electrode frames of the electrode tables so as to shift a flash trimmer upper unit and the rotary shear unit of the inlet side electrode table and the rotary shear unit of the outlet side electrode table and a pair of the upper and lower trimmer units are aligned in the plan view.

The flash welding apparatus attains smooth approach of the electrodes in the welding operation and which can control the distance for departing the inlet side electrode table from the outlet side electrode table as desired depending upon a scrape degree and the time for approaching the electrode tables after the scrape treatment can be shortened.

DETAILED DESCRIPTION OF THE PREFERRED EMBODIMENTS

Referring to the drawings, one embodiment of the present invention will be illustrated.

Figure 4:
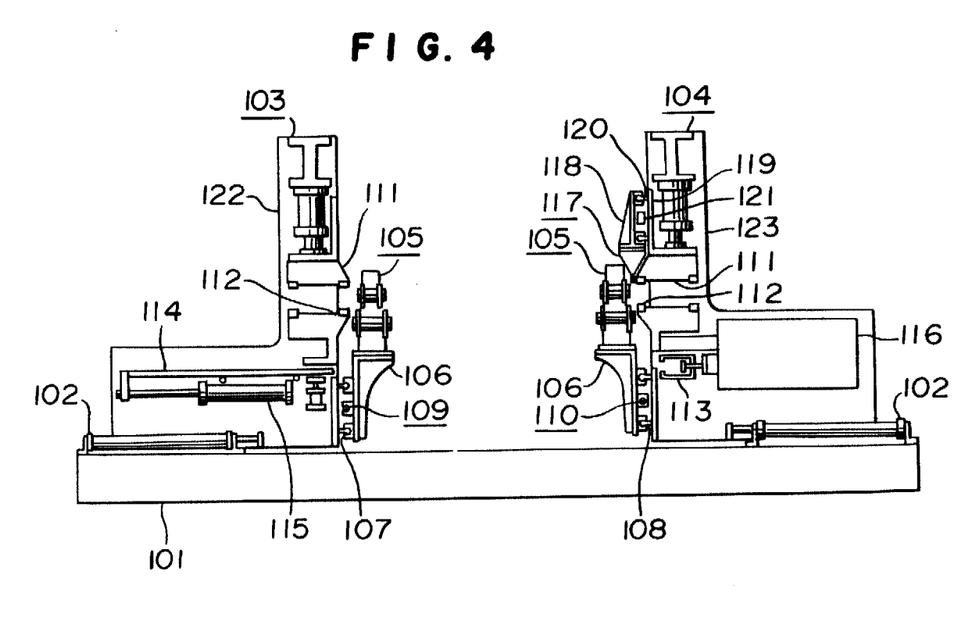
FIG. 4 is a front sectional view of one embodiment of a flash welding apparatus according to the present invention.
Figure 5:
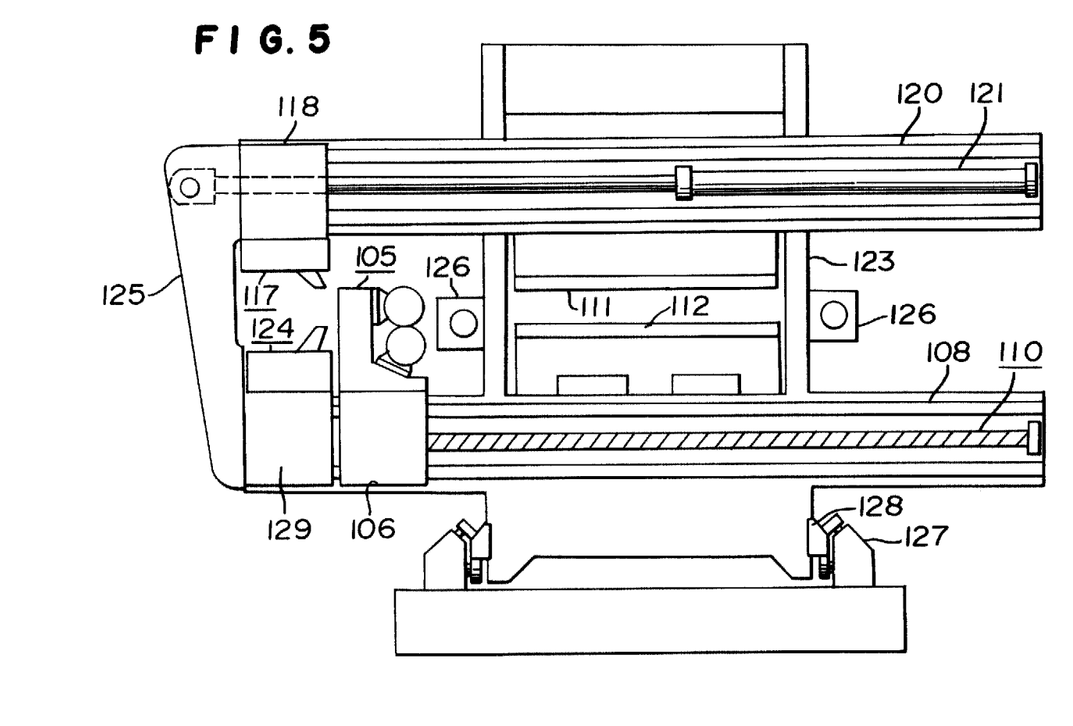
FIG. 5 is a side view of an outlet side electrode table from the direction of the strip line.

FIG. 4 is a front sectional view of one embodiment of the flash welding apparatus of the present invention, and FIG. 5 is a view of an outlet side electrode table from the line.

In FIG. 4, the reference (101) designates a lower frame; (102) designates an electrode table delivery cylinder mounted on the lower frame and an end of a rod of the cylinder is connected to the electrode table; (103) designates an inlet side electrode table; (104) designates an outlet side electrode table; (105) designates a rotary shear unit; (106) designates rotary shear unit fitting tables which are respectively shifted by a driving device (109) and a driving device (110) on a guide bar (107) and a guide bar (108) mounted at the lower parts of the inlet side electrode table (103) and the outlet side electrode table (104).

The reference (111) designates an upper electrode; (112) designates a lower electrode; (113) designates a detachable secondary conductor connecting part; (114) designates a secondary side bus-bar; (115) designates a secondary side bus-bar delivery cylinder; (116) designates a transformer for welding; (117) designates a trimmer upper unit; (118) designates a trimmer upper unit fitting table which is shifted by a trimmer unit delivery cylinder (121) on the guide bar (120) mounted on the electrode frame (119); (122) designates an inlet side electrode table holding frame; and (123) designates an outlet side electrode table holding frame.

In FIG. 5, the reference (124) designates a trimmer lower unit; (125) designates a connecting bar for connecting and moving synchronously the trimmer upper unit (117) and the trimmer lower unit (124); (126) designates a detachable up-set cylinder; (127) designates a guide mounted on the lower frame (101); (128) designates a guide bar mounted on the outlet side electrode table holding frame (123); (129) designates a trimmer lower unit fitting table which moves on the guide (108) on which the table (106) for fitting the rotary shear unit (105) is shifted.

Figure 6:
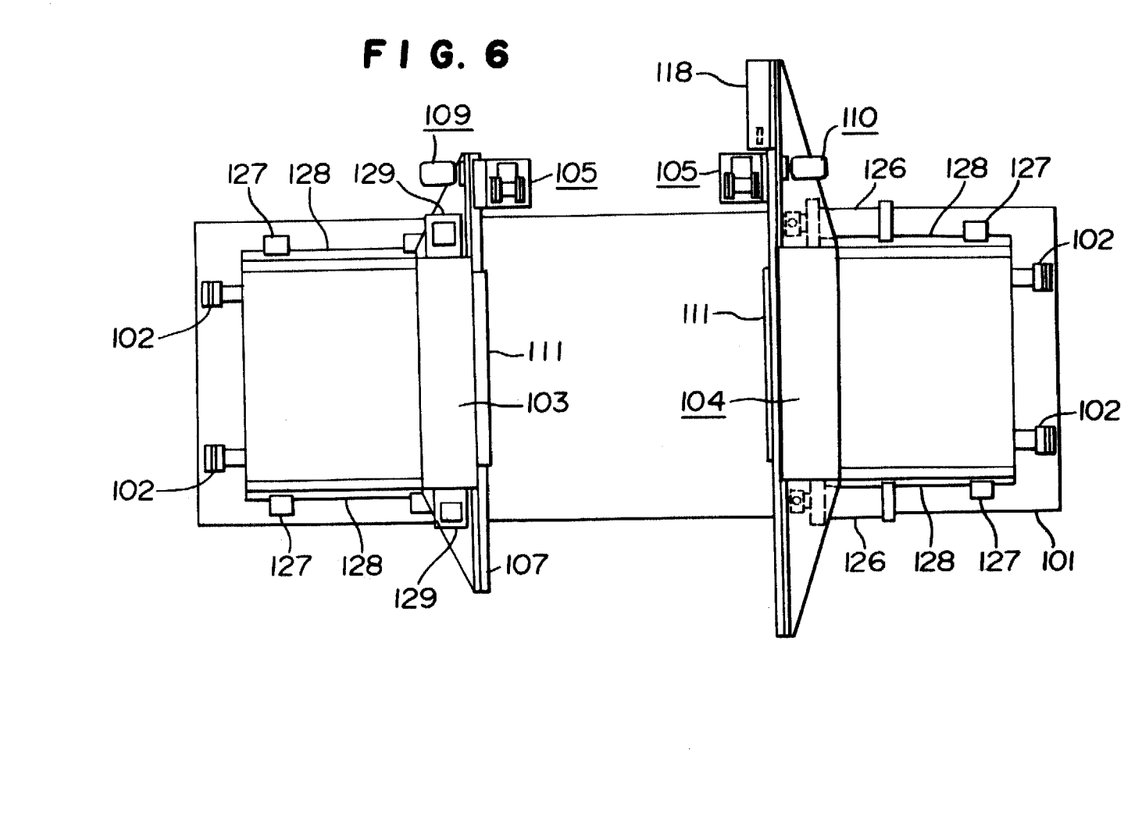
FIG. 6 is a plan view of the welding apparatus of the present invention in the waiting condition.

FIG. 6 shows the condition that the inlet side electrode table (103), the outlet side electrode table (104), the rotary shear unit (105) and the trimmer units (117), (124) are disposed at the original positions (waiting position).

Figure 7:
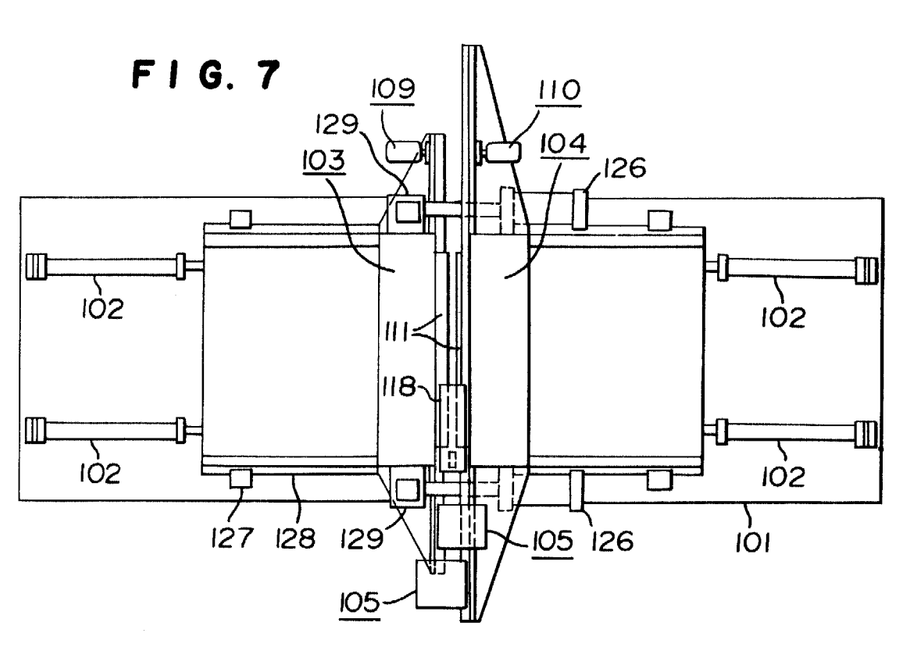
FIG. 7 is a plan view of the welding apparatus of the present invention in the condition completing a trimming operation after the welding operation.

FIG. 7 shows the condition completing the trimming after the welding operation.

In FIG. 7, the reference (129) designates a detachable mechanism of a detachable up-set cylinder.

Figure 8:
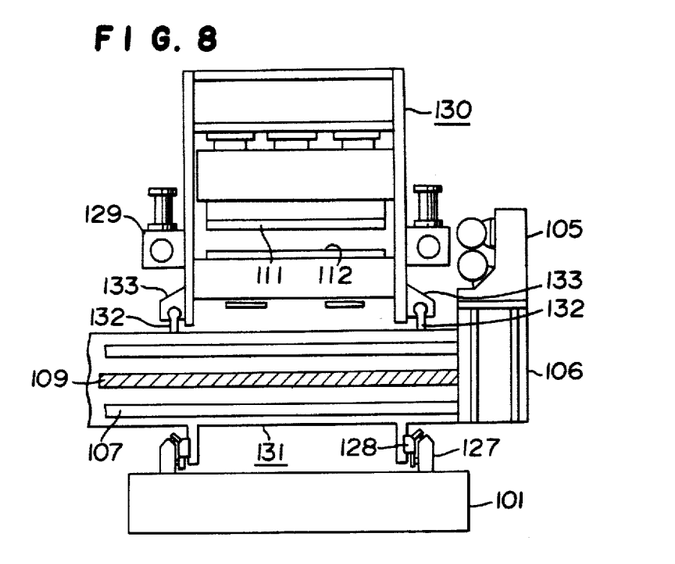
FIG. 8 is a side view of another embodiment of the welding apparatus of the present invention wherein an inlet side electrode table is divided into upper and lower units, from the direction of the strip line.

FIG. 8 is a side view of the inlet side electrode table from the strip line wherein the inlet side electrode table (103) is divided into the electrode table upper unit (130) comprising the upper and lower electrodes (111), (112) and the electrode table lower unit (131) comprising the rotary shear (105).

Figure 9:
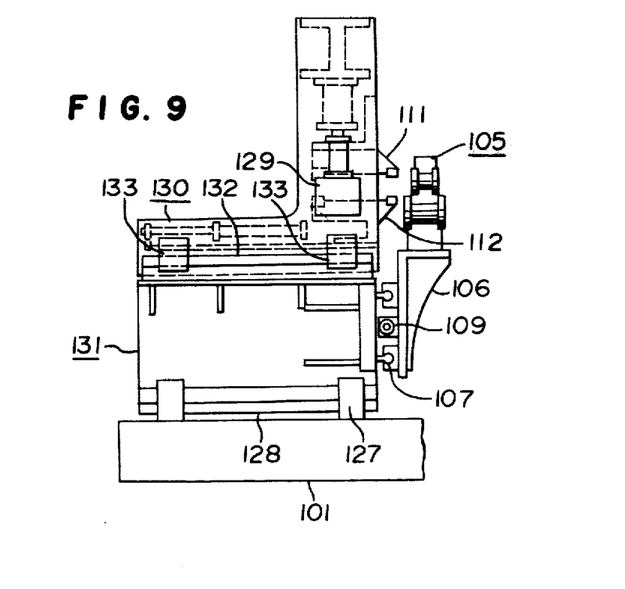
FIG. 9 is a front view of the embodiment of FIG. 8.

FIG. 9 is a front view of the inlet side electrode table of FIG. 8.

In FIG. 8, the reference (101) designates a lower frame; (127) designates a guide mounted on the lower frame; (128) designates a guide bar mounted on an electrode table lower unit (131) which is movable on the lower frame (101).

The electrode table lower unit (131) comprises the inlet side rotary guide bar (107) and an inlet side rotary shear driving device (109) to shift the rotary shear unit (105).

A guide bar (132) is mounted on the outer surface of the electrode table lower unit (131) in parallel to the strip line direction and a guide (133) combined to the guide bar is fitted on the outer surface of the electrode table upper unit (130). A detachable mechanism (129) of the detachable up-set cylinder (126) is mounted on both side surfaces of the electrode table upper unit (130), whereby the unit (130) can be fitted to the outlet side electrode table (104) so as to shift in independently from the electrode table lower unit (131).

The flash welding apparatus for an iron-steel continuous acid washing line of the present invention has been illustrated referring to FIGS. 4 and 5.

FIG. 6 shows the waiting condition and FIG. 7 shows the condition completing the trimming operation.

The length of the guide (108) for the rotary shear unit (105) of the outlet side electrode table (104) is longer than that of the guide (107) for the rotary shear unit (105) of the inlet side electrode table (103) for a length of one rotary shear unit.

In order to carry out the scrape treatment of the top and rear edges of the strip at the waiting position, the rotary shear unit (105) is shifted on the guide to the opposite end of the guide by the driving devices (109), (110). Then, the inlet side electrode table (103) and the outlet side electrode table (104) are mutually approached for the welding operation and the detachable up-set cylinder (126) and the detachable secondary conductor connecting part (113) is fitted to carry out the welding and the trimmer units (117), (124) are forwardly moved in the condition to complete the trimming operation.

FIG. 7 shows this condition.

The flash welding apparatus of the present invention has the structure that the rotary shear unit (105) of the inlet side electrode table (103), the rotary shear unit (105) of the outlet side electrode table (104) and a pair of the upper and lower trimmer units (117); (124) can be aligned to the direction perpendicular to the strip line at the time completing the trimming operation, whereby the inlet side electrode table (103) and the outlet side electrode table (104) can be approached to the position required for the welding operation.

In FIG. 8, the inlet side electrode table (103) is divided into the electrode table lower unit (131) having a rotary shear unit (105) and the electrode upper unit (130) having the upper and lower electrodes (111), (112) and the detachable mechanism (129) of the end of the rod of the detachable up-set cylinder (126) is fitted on the electrode table upper unit (130) whereby the outlet side electrode table (104) is fitted to the electrode table upper unit by the detachable set cylinder (126) and the detachable mechanism (129) after approaching the inlet side electrode table (103) and the outlet side electrode table (104) by the electrode table delivery cylinder (102). During the welding operation, only the electrode table upper unit (130) is shifted toward the outlet side electrode table (104).

In accordance with the present invention, the length of the guide for the rotary shear unit of the inlet side electrode table is different from the length of the guide for the rotary shear unit of the outlet side electrode table and two pairs of the rotary shears and one pair of the trimmers are arranged to align them in the direction perpendicular to the line, whereby the inlet side electrode and the outlet side electrode can be approached to the distance required for the welding operation and two pairs of the rotary shear units and one pair of the trimmer units can be completely stored in the inlet side electrode table and the outlet side electrode table.

Accordingly, the distance departing the inlet side electrode table from the outlet side electrode table can be decided depending upon the scrape treated in the welding apparatus, whereby the time required for approaching the tables for the welding operation after the scrape treatment can be shortened.

When the inlet side electrode table comprising the rotary shears, is divided into two parts, the inlet side electrode table is sufficiently approached to the outlet side electrode table and then, the electrode table upper unit can be further approached to the outlet side electrode table by the up-set cylinder, whereby even though a large size rotary shear unit having high rigidity for a thick sheet is assembled, the approaching characteristic of the electrode can be remarkably improved and it is also suitable for the welding of a thin sheet in a small gap between the electrodes.

In order to obtain high quality welded joints, it is necessary to be high up-set speed. In accordance with the present invention, the weight of the moving parts during the welding operation can be decreased whereby high up-set speed can be easily attained to be advantageous in the welding operation.

When the up-set speed is high, the vibration is caused in the guide of the rotary shear unit.

In the divided electrode table type apparatus, only the electrode table upper unit is shifted during the welding operation whereby the guide for the rotary shear unit can be simplified.

What is claimed is:

1. A flash welding apparatus which comprises an inlet side electrode table and an outlet side electrode table which are arranged in a strip line direction and are relatively movable to the strip line direction;
   an upper electrode and a lower electrode mounted on the inlet side electrode table;
   an upper electrode and a lower electrode mounted on the outlet side electrode table;
   guides disposed on surfaces facing the inlet side electrode table or the outlet side electrode table below the lower electrodes in a direction perpendicular to the strip line, and with one of said guides being longer than the other guides;
   at least one pair of rotary shear units being movable in the direction perpendicular to the strip line on one of the guides and at least one other pair of rotary shear units being movable in the same direction on the other guide whereby said one pair of said rotary shear units on said one of said guides is shifted further in the direction perpendicular to the strip line than the other pair of said rotary shear units on the other guide after a shearing operation is completed and immediately prior to the commencement of a welding operation; said one and said other pairs of rotary shear units being shifted relative to each other in the direction perpendicular to the strip line so that said inlet side electrode table and said outlet side electrode table can be shifted towards each other for the welding operation;
   a lower trimmer unit being movable on one of the guides;
   an upper trimmer unit facing the lower trimmer unit in the vertical direction and being mutually movable in synchronous condition;
   a guide for guiding the upper trimmer unit which is disposed above the upper electrode of one of the inlet side electrode table or the outlet side electrode table in the direction perpendicular to the strip line.

2. A flash welding apparatus according to claim 1 wherein at least one electrode table is divided into an electrode table upper unit mounting the upper and lower electrodes and an electrode table lower unit mounting the guide for guiding the rotary shear unit.

3. A flash welding apparatus according to claim 2 wherein a guide bar is mounted on an upper outer surface of the electrode table lower unit and a guide fitting to the guide bar is mounted on the outer surface of the electrode table upper unit.

4. A flash welding apparatus according to claim 1 wherein the upper trimmer unit is connected to the lower trimmer unit with a connecting bar and the upper trimmer unit is shifted by a delivery cylinder.

* * * * *